United States Patent
De Ayguavives et al.

(10) Patent No.: US 10,330,953 B2
(45) Date of Patent: Jun. 25, 2019

(54) OPHTHALMIC LENS

(71) Applicants: Francisco De Ayguavives, Charenton-le-Pont (FR); Helene Maury, Charenton-le-Pont (FR)

(72) Inventors: Francisco De Ayguavives, Charenton-le-Pont (FR); Helene Maury, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 0 days.

(21) Appl. No.: 14/399,970

(22) PCT Filed: May 16, 2013

(86) PCT No.: PCT/FR2013/051075
§ 371 (c)(1),
(2) Date: Nov. 10, 2014

(87) PCT Pub. No.: WO2013/171435
PCT Pub. Date: Nov. 21, 2013

(65) Prior Publication Data
US 2015/0098058 A1 Apr. 9, 2015

(30) Foreign Application Priority Data

May 16, 2012 (FR) ..................... 12 54529
Oct. 11, 2012 (FR) ..................... 12 59713

(51) Int. Cl.
*G02C 7/02* (2006.01)
*G02C 7/10* (2006.01)
(Continued)

(52) U.S. Cl.
CPC ............... *G02C 7/107* (2013.01); *G02B 1/11* (2013.01); *G02B 5/26* (2013.01); *G02B 5/283* (2013.01);
(Continued)

(58) Field of Classification Search
CPC .......... G02C 7/10; G02C 7/107; G02C 7/022; G02C 7/024; G02B 1/11
See application file for complete search history.

(56) References Cited

U.S. PATENT DOCUMENTS 5,694,240 A 12/1997 Sternbergh
8,360,574 B2 1/2013 Ishak et al.
(Continued)

FOREIGN PATENT DOCUMENTS

JP 2009-521001 5/2009
WO 2008/024414 A2 2/2008
(Continued)

OTHER PUBLICATIONS

Algvere et al., "Age-related maculopathy and the impact of blue light hazard", Acta Ophthalmologica Scandinavica, 2006, vol. 84, pp. 4-15.
"Standard Practice for Calculating Yellowness and Whiteness Indices from Instrumentally Measured Color Coordinates", Designation: E 313-05, pp. 1-6.
(Continued)

*Primary Examiner* — Darryl J Collins
*Assistant Examiner* — Journey F Sumlar
(74) *Attorney, Agent, or Firm* — Young & Thompson

(57) ABSTRACT

An ophthalmic lens having a main front face and a main rear face includes: an element for cutting off ultraviolet (UV) light incident on the main front face of the ophthalmic lens; an anti-reflection coating on the main rear face of the ophthalmic lens, having a weighted average reflection factor in the UV region of less than or equal to 7%; and at least one element for at least partially blocking the blue light in the wavelength region from 400 to 460 nanometers, preferably from 420 to 450 nanometers.

22 Claims, 3 Drawing Sheets

(51) Int. Cl.
  *G02B 1/11* (2015.01)
  *G02B 5/28* (2006.01)
  *G02B 5/26* (2006.01)
(52) U.S. Cl.
  CPC ............... *G02C 7/02* (2013.01); *G02C 7/10* (2013.01); *G02C 7/102* (2013.01); *G02C 7/104* (2013.01); *G02C 2202/16* (2013.01)

(56) References Cited

U.S. PATENT DOCUMENTS

| | | |
|---|---|---|
| 2004/0233524 A1 | 11/2004 | Lippey et al. |
| 2007/0166522 A1 | 7/2007 | Beinat et al. |
| 2010/0149483 A1 | 6/2010 | Chiavetta, III |
| 2012/0075577 A1 | 3/2012 | Ishak et al. |
| 2013/0222913 A1 | 8/2013 | Tomoda et al. |

FOREIGN PATENT DOCUMENTS

| | | |
|---|---|---|
| WO | WO 2012043218 | 4/2012 |
| WO | 2012/076714 A1 | 6/2012 |

OTHER PUBLICATIONS

Citek, Karl, "Anti-reflective coatings reflect ultraviolet radiation", Optometry, 2008, vol. 79, pp. 143-148.
Glazer-Hockstein et al., "Could Blue Light-Blocking Lenses Decrease the Risk of Age-Related Macular Degeneration?", Retina, 2006, vol. 26, pp. 1-4.
Ophthalmic optics—Spectacle lenses—Vocabulary, International Standard, ISO13666, First edition Aug. 1, 1998, pp. 1-59.
Tomany et al., "Sunlight and the 10-Year Incidence of Age-Related Maculopathy", Arch Ophthalmol., 2004, vol. 122, pp. 750-757.
International Search Rpeort, dated Dec. 17, 2013, from corresponding PCT application.
Elaine Kitchel, M.Ed., The Effects of Blue Light on Ocular Health, American Printing House for the Blind, pp. 1-12.
ISO 8980-3, International Standard, Ophthalmic optics—Uncut finished spectacle lenses—Parts 3: Transmittance specifications and test methods, Oct. 1, 2003.
ISO 8980-4, Norme Internationale, Optique ophtalmique—Verres de lunettes finish non detoures—Partie 4: Specifications et mehtodes d'essai relatives aux traitements antireflet, Jun. 1, 2000.
Third party observation received Oct. 11, 2017 in corresponding Japanese Patent Application No. 2015-512109.

OPHTHALMIC LENS

The present invention relates to the ophthalmic optics field.

BACKGROUND OF THE INVENTION

Field of the Invention

It relates more particularly to an ophthalmic lens comprising means for reducing both ultraviolet light and blue light, in particular phototoxic blue light arriving on the retina of a wearer of spectacles equipped with lenses of this type.

Throughout the present patent application, it will be referred to value ranges, in particular to ranges of wavelengths and angles of incidence. As used herein, "ranging from x to y" means "within the range from x to y", both limits x and y being included within this range.

As is conventionally the case, the main face of the lens furthest from the eye of a wearer is designated the front face and, in contrast, the main face of the lens closest the eye of the wearer is designated the back face.

Light that is visible to humans extends over a light spectrum ranging from a 380 nanometers (nm) wavelength to a 780 nm wavelength approximately. The part of this spectrum, ranging from around 380 nm to around 500 nm, corresponds to a high-energy, essentially blue light.

Ultraviolet (UV) light is the portion of the luminous spectrum below 380 nm and ranging up to 100 nm. The UVB corresponds to the range from 280 nm to 320 nm and the UVA to the range from 320 to 380 nm.

Description of the Related Art

Many studies (see for example Kitchel E., "*The effects of blue light on ocular health*>>, Journal of Visual Impairment and Blindness Vol. 94, No. 6, 2000 or Glazer-Hockstein and al., Retina, Vol. 26, No. 1. pp. 1-4, 2006) suggest that blue light has phototoxic effects on the eye, and especially on the retina.

Indeed, ocular photobiology studies (Algvere P. V. and al., "*Age-Related Maculopathy and the Impact of the Blue Light Hazard*>>, Acta Ophthalmo. Scand., Vol. 84, pp. 4-15, 2006) and clinical trials (Tomany S. C. and al., "*Sunlight and the 10-Year Incidence of Age-Related Maculopathy. The Beaver Dam Eye Study*>>, Arch Ophthalmol., Vol. 122. pp. 750-757, 2004) demonstrated that an excessively prolonged or intense exposure to blue light may induce severe ophthalmic diseases such as age-related macular degeneration (ARMD).

However, part of this blue light, with a wavelength ranging from 465 nm to 495 nm approximately, promotes health since it is implicated in mechanisms for regulating biorhythms, referred to as "circadian cycles".

Thus, it is recommended to limit the exposure to potentially harmful blue light, in particular as regards the wavelength band which presents an increased risk (see especially Table B1, ISO 8980-3 standard:2003 (E) with reference to the B($\lambda$) blue light hazard function).

To that end, it may be advisable to wear in front of each of both eyes an ophthalmic lens which prevents or limits the phototoxic blue light transmission to the retina.

It has already been suggested, for example in the patent application WO 2008/024414, to cut at least partially, the troublesome part of the blue light spectrum from 400 nm to 460 nm, by means of lenses comprising a film partially inhibiting the light in the suitable wavelength range, through absorption or through reflection.

Filters cutting off blue light are also described in patent U.S. Pat. No. 8,360,574.

It is furthermore necessary to eliminate as much as possible the harmful influence of ultraviolet light (UV light) on the eye of a wearer of the lens.

Moreover, the person skilled in the art is seeking filters which make it possible to minimize the amount of harmful blue light received by the retina, while preserving the ability to efficiently transmit the visible light at wavelengths higher than 465 nm, on the one hand so as to maintain good vision for the wearer and, on the other hand, not to alter the circadian cycles.

The difficulty lies in the fact that 420 nm to 450 nm wavelength ranges, that are to be filtered, are very close to the wavelength ranges which should not be filtered, or very little.

BRIEF SUMMARY OF THE INVENTION

The main object of the present invention is therefore to provide an ophthalmic lens that both effectively reduces the amount of UV light received by a wearer of the lens and the amount of blue light received by a wearer of the lens.

In the particular case where the light-blocking means is a filter, especially one formed by a coating preventing reflection of visible light, it would be desirable to optimize this filter.

One more specific object of the present invention is to provide an ophthalmic lens comprising a reflection filter, which would take the whole light irradiation into account, which originates from the surrounding area, and reduce the blue light amount received by the eye within the wavelength range of from 420 nm to 450 nm.

Another object of the invention is to provide an ophthalmic lens comprising such a reflection filter which allows an outstanding transmission within the wavelength range of from 465 nm to 495 nm.

It is another object of the present invention to provide an ophthalmic lens comprising means for reducing the UV light and the blue light received by a person wearing the lens and in particular a lens comprising a reflection filter with the hereabove mentioned properties, which would be easy and economical to implement on the industrial level.

The above aims are achieved according to the invention by an ophthalmic lens having a front main face and a back main face comprising:

a means for cutting off ultraviolet (UV) light arriving on the front main face of the ophthalmic lens;

an antireflection coating, on the back main face of the ophthalmic lens, having a weighted average reflection factor in the UV lower than or equal to 7%, preferably lower than or equal to 6%, better still lower than or equal to 5%, better still lower than or equal to 4.5% and ideally lower than or equal to 4%. Other optimal weighted average reflection factor values in the UV are lower than or equal to 3.5% and even better lower than or equal to 3%; and at least one means at least partially blocking the blue light in the wavelength range extending from 400 to 460 nanometers and preferably from 420 to 450 nanometers.

Preferably, the lens according to the invention has a weighted transmission factor in the visible, $\tau_v$, of at least 90% (standard ISO 13266-1998).

The means for cutting off the UV light arriving on the front main face of the lens may be formed by the lens substrate itself either by virtue of its own specific nature or because one or more UV absorbers have been incorporated and dispersed in the material of the substrate. Among usable UV absorbers, mention may be made of oxanilides, benzophenones, dihydroxybenzophenones, benzotriazoles, benzoates, phenyl benzoates, benzimidazoles, hydroxyphenyl triazines and sterically hindered amines (HALS). Such UV absorbers are commercially available especially under the trade names UVINUL® (BASF) and PARSOL® (GIVAUDAN).

The means for cutting off UV light may also be a UV-absorbing coating or a UV-reflecting coating placed on the front main face of the ophthalmic lens.

UV-absorbing coatings are known in the art. By way of example, mention may be made of transparent polymer films containing one or more UV absorbers such as those mentioned above.

UV-reflecting coatings are also known. Conventional antireflection coatings may be used for this purpose, these coatings, as is known, having a relatively high or high reflectance in the UV range (280-380 nm) (see the article "Anti-reflecting coatings reflect ultraviolet radiation, Citek, K Optometry, 2008, 79, 143-148).

The average reflection in the UVA and UVB regions may reach high levels (up to 60%) for certain conventional antireflection coatings. Typically, the average reflection in the UV for the antireflection coatings used commercially is from 10 to 25% for an angle of incidence of 30° and an angle of incidence of 45°.

Of course, the means for cutting off UV may be any combination of the means described above.

As indicated above, the ophthalmic lens according to the invention comprises, on its back main face, an antireflection coating having a weighted average reflection factor in the UV ($R_{UV}$) lower than or equal to 7%, preferably lower than or equal to 6%, better still lower than or equal to 5%, better still lower than or equal to 4.5% and ideally lower than or equal to 4%. Other optimal weighted average reflection factor values in the UV are lower than or equal to 3.5% and better still lower than or equal to 3%. This weighted average reflection factor in the ultraviolet region, between 280 and 380 nm, for an incidence of 30° and an incidence of 45°, is given by the relation:

$$R_{UV} = \frac{\int_{280}^{380} W(\lambda) R(\lambda) \cdot d\lambda}{\int_{280}^{380} W(\lambda) \cdot d\lambda}$$

where $R(\lambda)$ represents the spectral reflection factor at a given wavelength, and $W(\lambda)$ represents a weighting function equal to the product of the irradiance of the solar spectrum $Es(\lambda)$ and the relative spectral efficiency function $S(\lambda)$.

The spectral function $W(\lambda)$, defined according to standard ISO 13666:1998 allows transmission factors to be calculated for the ultraviolet radiation.

Such antireflection coatings are described, inter alia, in international patent application WO 2012/076714 A1.

Preferably, the means for cutting off UV light arriving on the front face of the lens cuts off 90%, preferably 95% or more, better still 100% of the incident UV light.

According to the invention, the ophthalmic lens furthermore comprises at least one means blocking, at least partially, the blue light in the wavelength range 400 to 460 nm and preferably in the wavelength range 420 to 450 nm.

Preferably, the blue-light blocking means blocks from 5 to 50%, preferably 10 to 50%, better still from 15 to 50% and optimally from 20 to 50% of the blue light in the wavelength range from 400 to 460 nanometers, and preferably in the wavelength range from 420 to 450 nanometers.

Many means for producing such a blue-light blocking filter are known in the art, these means comprising absorption, reflection and interference techniques or combinations of these techniques.

According to one technique, the lens may be tinted/colored with a blue-light blocking dye, such as the products BPI Filter Vision 450 or BPI Diamond Dye 500, in an appropriate proportion or concentration. The lens may for example be dyed by submerging it in a hot bath containing the blocking dye solution for a preset length of time.

According to another technique, a filter formed on at least one of the main faces of the lens is used to block the blue light.

The filter may for example include organic or inorganic compounds that absorb and/or reflect and/or interfere with the wavelengths of the blue light. The filter may be made up of multiple thin films of organic and/or inorganic substances. Each layer may have properties that, in combination with the other layers, absorb, reflect or interfere with the wavelengths of the blue light.

Among blue-light blocking substances, mention may be made of perylene, molecules based on porphyrin, coumarin and acrydine.

The blue-light blocking substance may be inserted by directly incorporating it into the substrate, by adding it to a polymer coating, by impregnating the lens with it, by incorporating it into a stratified structure comprising a layer impregnated therewith, or it may take the form of a composite material impregnated with microparticles thereof.

In a recommended embodiment of the invention, the blue-light blocking filter consists of a multilayer, optionally a "rugate filter", of thin, preferably inorganic, dielectric layers having alternately low and high refractive indices, such as $SiO_2$ and $TiO_2$. Design parameters, such as the thickness of each thin layer, the refractive index of each layer and the number of layers, determine the performance of the multilayer.

Filters of this type are described, inter alia, in U.S. Pat. No. 6,984,038 and No. 7,066,596.

Generally, blue-light blocking filters are described in U.S. Pat. No. 8,360,574.

In a preferred embodiment of the invention, the blue-light blocking filter is a filter, especially a coating preventing reflection of visible light, formed on at least one main face of the lens and that provides this main face of the lens with the following property:

for an angle of incidence θ ranging from 0° to 15° and for an angle of incidence θ' ranging from 30° to 45°, a parameter $\Delta(\theta,\theta')$ defined by the relation $\Delta(\theta,\theta')=1-[R_{\theta'}(435\ nm)/R_{\theta}(435\ nm)]$, so that this parameter $\Delta(\theta, \theta')$ is higher than or equal to 0.5 and preferably higher than or equal to 0.6, where $R_{\theta}(435\ nm)$ represents the reflectivity value of the main face comprising said filter at a 435 nanometer-wavelength for the angle of incidence θ, and $R_{\theta'}(435\ nm)$ represents the reflectivity value of the main face comprising said filter at a 435 nanometer-wavelength for the angle of incidence θ'.

Preferably, the above filter also provides the main face comprising it with the following property:

a spectral reflectivity curve for an angle of incidence ranging from 0° to 15° having:
  a reflectivity maximum at a wavelength lower than 435 nanometers; and a full width at half maximum (FWHM) higher than or equal to 70 nm, preferably higher than or equal to 75 nm and better still higher than or equal to 80 nm and lower than 150 nm, preferably lower than or equal to 120 nm and better still lower than or equal to 110 nm.

Preferably, the ophthalmic lens according to the invention is designed such that the average light reflection factor in the visible ($R_v$) on each of the main faces of the ophthalmic lens is equal to 3%, better still lower than or equal to 2.5%, better still lower than or equal to 2% and preferably lower than or equal to 1.5%, and optimally lower than or equal to 1%.

In any case, the ophthalmic lens according to the invention may also comprise a "color balancing" component in order to reduce, shift, neutralize or compensate for yellowing and any browny-yellowish coloring or any other undesirable effect due to the blocking of the blue light in order to produce a cosmetically acceptable lens.

Thus, the component may be a coating formed on a main face of the lens, generally the face opposite that comprising the blue-light blocking means, said coating having been treated with one or more color-balancing additives, for example an appropriate combination of red and green dyes. The color-balancing component may be a monolayer or multilayer film such as an antireflection coating or an antiabrasion coating.

Color balancing may be carried out in the lens both for transmitted light and for reflected light.

Components for balancing light are in particular described in U.S. Pat. No. 8,360,574.

The lens may have a high yellow index. The latter will increase in proportion to the amount of blue light blocked by the filter, in the absence of color-balancing components.

The Yi values measured in accordance with standard ASTM E 313 05 may therefore be high (higher than 50). Preferably, the values of Yi are lower than or equal to 50, 40, 35, 30, 25, 23, 20, 15, 10, 9, 7 or 5.

In a recommended embodiment, the ophthalmic lens according to the invention forms a spectacle glass, especially a corrective glass, this spectacle glass possibly being a clear glass, a tinted glass, a sun glass or a photochromic glass.

Generally speaking, filters may be designed, which are said to be "narrow", highly selective, having a limited bandpass and a peak in reflectivity centered on this bandpass. For limiting the phototoxic blue light transmission to the retina, a suitable narrow-band filter thus should have for example a full width at half maximum of 30 nm between 420 nm and 450 nm, and a maximum reflectivity for the wavelength around the center of 435 nm.

In practice, highly selective, narrow-band filters are typically composed of an overall thick stack, comprising a large number of dielectric layers.

Such filters require a long and expensive industrial manufacturing process, especially when deposited under vacuum. Increasing the number of layers and the number of interfaces makes it also difficult to obtain good mechanical properties.

Taking the hereabove mentioned constraints into account makes it necessary to limit the number of layers, which as a result limits the performances in terms of spectral selectivity (the full width at half maximum of such a narrow-band filter may then reach up to 70 nm) and angular selectivity, the filter becoming angularly poorly selective. This means that if, for wavelengths ranging from 420 nm to 450 nm, the reflectivity of the main face of an ophthalmic lens provided with such a narrow-band filter is high for angles of incidence on this main face ranging from 0° to 15°, then the reflectivity for angles of incidence ranging from 30° to 45° on the same main face will also be relatively high.

The angle of incidence is classically defined as the angle between the perpendicular to the surface at the point of incidence and the direction of the light beam striking this surface.

This results in a number of consequences for a spectacle wearer having ophthalmic lenses, on the front main face of which an optical narrow-band filter such as previously described has been deposited. It should be understood in the present context that the front main face of the ophthalmic lens is that main face of the ophthalmic lens, which is the most distant from the spectacle wearer's eyes. By contrast, the ophthalmic lens main face, which is the closest to the wearer's eyes is the back main face.

When the ophthalmic lenses are thus positioned in relation to the wearer's eyes, they receive, on the one hand, some "direct" incident light on the front main faces of the ophthalmic lenses, and, on the other hand, some "indirect" light originating from the wearer's background and reflected by the ophthalmic lenses.

The light coming from the wearer's background, reflected by the ophthalmic lens and directed to the wearer's eye is mainly the incident light on the ophthalmic lens back main face according to angles of incidence ranging from 30° to 45°.

This visible light originating from the wearer's background at an angle of incidence ranging from 30° to 45° goes through the back main face, onto which a first reflection occurs, then through the substrate, to reach thereafter the front main face comprising said filter.

Moreover, it is known that the optical properties of a filter deposited onto the front main face of an ophthalmic lens, for example reflectivity, are equivalent, whatever the light, being incident on the side of the front main face or originating from the side of the back main face.

If the narrow-band filter efficiently reflects the blue light at a wavelength ranging from 420 nm to 450 nm for an angle of incidence on the front main face ranging from 30° to 45°, then it also efficiently reflects that blue light coming from the back, for an angle of incidence ranging from 30° to 45° on the back main face.

Thus, even if the direct light incident on the front main faces of the ophthalmic lenses is efficiently rejected through the reflection to the narrow-band filters deposited onto the front main faces, the indirect light originating from the wearer's background is reflected in the same manner to the spectacle wearer's eyes.

Ultimately, despite the use of a narrow-band filter, the amount of phototoxic blue light reaching the wearer's retina can be relatively high and be harmful to the wearer.

Moreover, the filter, whatever the location thereof, on the front face or on the back face, behaves in the same way as regards the light within the wavelength range of from 420 nm to 450 nm, since the ophthalmic lens, in both cases, transmits the light within the wavelength range of from 420 nm to 450 nm. The same phototoxic blue light-induced harmful consequence thus applies for the wearer if the filter, instead of being deposited onto the front main face of the ophthalmic lens, is applied on the back main face thereof.

Moreover, as already previously mentioned, narrow-band reflection filters comprising a limited number of layers and a thickness compatible with a large-scale industrial production suffer from a reduced spectral selectivity, and are likely to reflect a significant part of the light within the circadian cycle-governing range.

To address the needs of the present invention and remove the mentioned drawbacks of the prior art, the present invention provides an ophthalmic lens provided with a reflection filter, which would enable to reduce the amount of phototoxic blue light striking the retina of a user wearing such ophthalmic lens, while preserving at best the circadian cycles.

To that end, the present invention relates to an ophthalmic lens having a front main face and a back main face, at least one of both main faces comprising a filter, which provides the main face comprising said filter with the following properties:

an average blue reflectance factor ($R_{m,B}$) within a wavelength range of from 420 nanometers to 450 nanometers, which is higher than or equal to 5%, for an angle of incidence ranging from 0° to 15°, a spectral reflectivity curve for an angle of incidence ranging from 0° to 15°, such reflectivity curve having:
   a maximum reflectivity at a wavelength of less than 435 nanometers, and
   a full width at half maximum (FWHM) higher than 80 nanometers, and for an angle of incidence θ ranging from 0° to 15° and for an angle of incidence θ' ranging from 30° to 45°, a parameter $\Delta(\theta,\theta')$ defined by the relation $\Delta(\theta,\theta')=1-[R_{\theta'}(435\ nm)/R_{\theta}(435\ nm)]$, so that this parameter $\Delta(\theta,\theta')$ is higher than or equal to 0.6, where
   $R_{\theta}(435\ nm)$ is the reflectivity value of the main face comprising said filter, at a 435 nanometer-wavelength for the angle of incidence θ, and
   $R_{\theta'}(435\ nm)$ is the reflectivity value of the main face comprising said filter at a 435 nanometer-wavelength for the angle of incidence θ'.

In another embodiment, the present invention relates to an ophthalmic lens having a front main face and a back main face, at least one of both main faces comprising a filter, which provides the main face comprising said filter with the following properties:

an average blue reflectance factor ($R_{m,B}$) within a wavelength range of from 420 nanometers to 450 nanometers, which is higher than or equal to 5%, for an angle of incidence ranging from 0° to 15°, a spectral reflectivity curve for an angle of incidence ranging from 0° to 15°, this reflectivity curve having:
   a maximum reflectivity at a wavelength of less than 435 nanometers, and
   a full width at half maximum (FWHM) higher than or equal to 70 nanometers, preferably higher than or equal to 75 nm, and for an angle of incidence θ ranging from 0° to 15° and for an angle of incidence θ' ranging from 30° to 45°, a parameter $\Delta(\theta,\theta')$ defined by the relation $\Delta(\theta,\theta')=1-[R_{\theta'}(435\ nm)/R_{\theta}(435\ nm)]$, so that this parameter $\Delta(\theta,\theta')$ is higher than or equal to 0.5, where
   $R_{\theta}(435\ nm)$ is the reflectivity value of the main face comprising said filter at a 435 nanometer-wavelength for the angle of incidence θ, and
   $R_{\theta'}(435\ nm)$ is the reflectivity value of the main face comprising said filter at a 435 nanometer-wavelength for the angle of incidence θ' and for an angle of incidence ranging from 0° to 15°, a parameter $\Delta_{spectral}$ defined by the relation $\Delta_{spectral}=1-[R_{0°-15°}(480\ nm)/R_{0°-15°}(435\ nm)]$, so that this parameter $\Delta_{spectral}$ is higher than or equal to 0.8, where $R_{0°-15°}(480\ nm)$ is the reflectivity value of the front main face at a 480 nanometer-wavelength for the relevant incidence, and $R_{0°-15°}(435\ nm)$ is the reflectivity value of the front main face at a 435 nanometer-wavelength for the relevant incidence.

Thus, the ophthalmic lens of the invention makes it possible to minimize the phototoxic blue light transmission to the retina of a user wearing such an ophthalmic lens, as a result of, on the one hand, its average reflectivity within a wavelength range of from 420 nm to 450 nanometers and, on the other hand, its angular selectivity.

Indeed, the ophthalmic lens provided with said filter, at a given wavelength, has an essentially different reflectivity for two essentially different angles of incidence on the main face comprising said filter.

Moreover, this filter is off-centered as compared to the phototoxic blue light wavelength band, which ranges from 420 nanometers to 450 nanometers. Indeed, the ophthalmic lens has a maximum reflectivity at a wavelength lower than 435 nanometers. This makes it then possible to adjust the angular selectivity of the lens.

The spectral characteristics (reflectivity, $R_m$, $R_v$, ...) of each main face of an ophthalmic lens of the invention are determined classically for an incident light beam striking the main face from air, without having gone through the substrate.

Finally, an ophthalmic lens of the invention having a parameter $\Delta(\theta,\theta')$ such as defined hereabove makes it possible to:

maximize the reflection of the phototoxic blue light originating from the front main face side, the intensity of this reflection depending on the measurable value $R_{\theta}(435\ nm)$, and minimize the reflection of the phototoxic blue light originating from the back main face side, the intensity of this reflection depending on the measurable value $R_{\theta'}(435\ nm)$.

Thus, the ophthalmic lens of the invention, provided with its filter, reduces the phototoxic blue light global transmission to the retina of a user wearing such an ophthalmic lens.

The provided filter having a greater full width at half maximum as compared to a narrow-band filter, it proves to be thinner than such a narrow-band filter and has not so many layers, and, as a consequence, is easier and cheaper to produce as compared to a narrow-band filter.

Moreover, other advantageous and non-limiting characteristics of the ophthalmic lens of the invention are as follows:

the filter is formed on the front main face of the ophthalmic lens;

the parameter $\Delta(\theta,\theta')$ is defined for an angle of incidence θ on the main face comprising said filter such that θ=15° and for an angle of incidence θ' on the main face comprising said filter such that θ'=45°;

the parameter $\Delta_{spectral}$ is defined for an angle of incidence of 15°;

the parameter $\Delta(\theta,\theta')$ is higher than or equal to 0.65, more preferably higher than or equal to 0.7, even more preferably higher than or equal to 0.75, and most preferably higher than or equal to 0.8;

the maximum reflectivity is at a wavelength lower than or equal to 410 nm, more preferably lower than or equal to 400 nm, and even more preferably, lower than or equal to 390 nm;

the maximum reflectivity is at a wavelength higher than or equal to 350 nanometers, preferably within the wavelength range of from 360 nm to 400 nm, more preferably within the wavelength range of from 370 nm to 390 nm;

the full width at half maximum is higher than or equal to 90 nanometers, preferably higher than or equal to 100 nanometers;

the full width at half maximum is lower than or equal to 150 nanometers, preferably lower than or equal to 120 nanometers, more preferably lower than or equal to 110 nm.

Thus, the full width at half maximum generally ranges from 80 nm to 150 nm, preferably from 90 nm to 120 nm, more preferably from 90 nm to 110 nm and even more preferably from 100 nm to 110 nm.

Finally, other advantageous and non-limiting characteristics of the ophthalmic lens of the invention are as follows:

the reflectivity value at the maximum level of reflectivity of the main face comprising the filter, for an angle of incidence of 15°, is preferably at least 1.5 times higher, more preferably at least 2 times higher and most preferably at least 2.5 times higher than the reflectivity value of the same main face, for the same angle of incidence, and at a wavelength of 435 nm;

the ratio $[R_{15°}(435\ nm)-R_{15°}(480\ nm)]/R_{15°}(435\ nm)$, where $R_{15°}(435\ nm)$ and $R_{15°}(480\ nm)$ do respectively represent the reflectivity of the ophthalmic lens main face comprising said filter at a wavelength of 435 nm and at a wavelength of 480 nm, for an angle of incidence on this main face of 15°, is higher than or equal to 0.8, more preferably higher than or equal to 0.85 and even more preferably higher than or equal to 0.9. This ratio expresses the outstanding selectivity of the filter provided on the ophthalmic lens of the invention which enables to protect the phototoxic band without disturbing the chronobiological band;

the average luminous reflectance factor ($R_v$) on the ophthalmic lens main face provided with the filter is lower than or equal to 2.5%, preferably lower than or equal to 1.5%;

the average luminous reflectance factor ($R_v$) on each of the main faces of the ophthalmic lens is lower than or equal to 2.5%, preferably lower than or equal to 1.5%;

the average luminous reflectance factor ($R_v$) on the ophthalmic lens main face provided with the filter is lower than or equal to 0.7%;

the filter is formed on the front main face of the ophthalmic lens and the (unweighted) average reflectance factor within the ultraviolet range (UV) ranging from 300 nm to 380 nm, for an angle of incidence on this front main face of 15°, is higher than or equal to 15%, more preferably higher than or equal to 20% and even more preferably higher than or equal to 25%;

the filter is an interference filter;

the filter comprises a number of layers lower than or equal to 11, preferably ranging from 2 to 10 layers, and more preferably from 4 to 9 layers and even more preferably from 4 to 7 layers;

the filter has a total thickness lower than or equal to 700 nanometers, preferably lower than or equal to 600 nanometers, and even more preferably lower than or equal to 550 nm, and most preferably ranging from 200 nm to 400 nm;

the ophthalmic lens back main face comprises an anti-UV coating, that is to say a coating that poorly reflects the UV radiation, preferably an antireflection coating efficient in both the ultraviolet and the visible portions of the spectrum.

Moreover, the ophthalmic lens of the invention advantageously contributes to the production of spectacles.

Thus, the present invention also provides spectacles comprising at least one ophthalmic lens of the invention.

According to one of its aspects, the subject of the invention is the use of an ophthalmic lens according to the invention to increase the visual contrast of a wearer. The use of lenses according to the invention thus makes it possible to improve the visual comfort of the wearer, and especially makes it possible for him or her to recognize more easily objects or people seen through said ophthalmic lens. The ophthalmic lens according to the invention may be used to advantageous effect by anyone, in particular a healthy person not presenting an ocular pathology or being predisposed to such a pathology.

Moreover, the use of an ophthalmic lens of the invention reveals to be particularly interesting for a therapeutic use or to prevent diseases related to blue light-induced phototoxicity.

The invention further provides the use of an ophthalmic lens of the invention to reduce the risks of an ophthalmic pathology occurring as a result of a degenerative process caused by the phototoxicity of blue light.

The invention finally provides the use of an ophthalmic lens of the invention to protect at least part of the wearer's eye against the blue light-induced phototoxicity, in particular against a degenerative process such as age-related macular degeneration (ARMD).

BRIEF DESCRIPTION OF THE DRAWINGS

A preferred embodiment of the invention will be described in more detail by referring to the appended figures, amongst which ophthalmic lenses are provided with a blue-light filter according to the invention on their front main face.

DETAILED DESCRIPTION OF THE PREFERRED EMBODIMENTS

Figure 1:
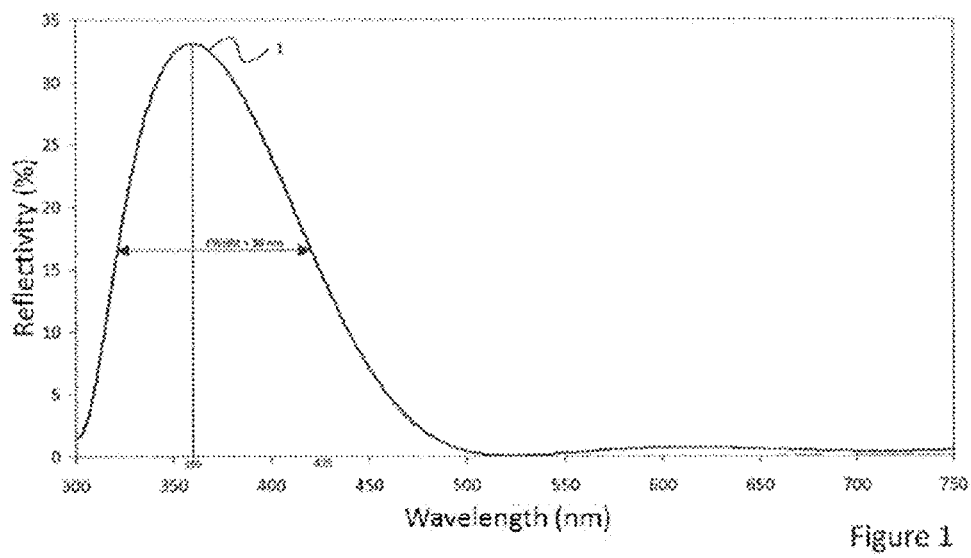
FIGS. 1 to 3 show the spectral reflectivity curves for an angle of incidence on the front main face of 15°, of some ophthalmic lenses prepared in Examples 1 to 3 of the present application.

As is well known, the ophthalmic lens of the invention comprises a transparent substrate made of organic or mineral glass. This substrate may comprise one or more functional coatings to provide the ophthalmic lens with particular optical and/or mechanical properties, such as, for example, an impact-resistant coating, an abrasion-resistant coating, an anti-reflection coating, an anti-UV coating, an antistatic coating, a polarizing coating, and an anti-fouling and/or anti-fogging coating. All these coatings are well known in the ophthalmic lenses art.

The ophthalmic lens substrate of the invention is preferably made of organic glass, for example a thermoplastic or a thermosetting plastic material.

To be mentioned as thermoplastic materials for use in the substrates are (meth)acrylic (co)polymers, in particular poly (methyl methacrylate) (PMMA), thio(meth)acrylic (co)polymers, polyvinylbutyral (PVB), polycarbonates (PC), polyurethanes (PU), poly(thiourethanes), polyol allylcarbonate (co)polymers, ethylene/vinylacetate thermoplastic copolymers, polyesters such as poly(ethylene terephthalate) (PET) or poly(butylene terephthalate) (PBT), polyepisulfides, polyepoxides, copolymers of polycarbonates and polyesters, copolymers of cycloolefins such as copolymers of ethylene and norbornene or ethylene and cyclopentadiene, and their combinations.

The term (co)polymer is intended to mean a copolymer or a homopolymer. A (meth)acrylate is intended to mean an acrylate or a methacrylate. As used herein, a polycarbonate (PC) is intended to mean both homopolycarbonates and copolycarbonates and block copolycarbonates.

Most particularly recommended substrates include those substrates obtained through (co)polymerization of diethyleneglycol bis allyl carbonate, sold, for example, under the trade name CR-39® by the company PPG Industries (ORMA® lenses ESSILOR), or through polymerization of thio(meth)acrylic monomers, such as those described in the French patent application FR 2734827. The substrates may be obtained through polymerization of the hereabove mixtures of monomers, or may also comprise mixtures of such polymers and (co)polymers.

Polycarbonates are other preferred substrates.

The ophthalmic lens has a front main face and a back main face.

The expression back main face is intended to mean the main face which, when the ophthalmic lens is in use, is the closest to the wearer's eye. It is generally a concave face. Conversely, the expression front main face is intended to mean the main face which, when the ophthalmic lens is in use, is the most distant from the wearer's eye. It is generally a convex face.

According to the present invention, at least one of both main faces of the ophthalmic lens comprises a filter.

As previously mentioned, the ophthalmic lens substrate may comprise various coatings either on the front main face of the ophthalmic lens, or on the back main face thereof.

A coating, which is said to be "on" the substrate or which has been deposited "onto" the substrate is defined as a coating, which:

(i) is located over a main face of the substrate, (ii) is not necessarily in contact with the substrate, that is to say one or more intermediate coatings may be inserted between the substrate and the relevant coating, and (iii) does not necessarily completely cover the main face of the substrate.

When "a layer A is located under a layer B", it should be understood that the layer B is more distant from the substrate than the layer A.

In an embodiment, the filter is directly formed on the front main face of the ophthalmic lens.

In another preferred embodiment, it is directly deposited onto an anti-abrasion coating and/or a scratch-resistant coating, having been itself deposited onto the front main face of the ophthalmic lens.

Prior to depositing the filter, it is common to submit the surface of said substrate, to a physical or chemical activating treatment, which is intended to increase the adherence of the filter to the main face(s).

Such pre-treatment is generally conducted under vacuum. It may come as a bombardment with energetic species, for instance an ion beam ("Ion Pre-Cleaning" or "IPC"), or an electron beam, a treatment through corona discharge, an ion spallation, an UV treatment or a plasma treatment under vacuum, generally with oxygen or argon plasma. It may also come as a surface treatment using an acid or a base and/or solvents (water or organic solvent).

In the present application, the spectral reflectivity of the ophthalmic lens, for a given angle of incidence of the face comprising said filter, represents the variation of the reflectivity (i.e. reflectance factor) at this angle of incidence depending on the wavelength. The spectral reflectivity curve corresponds to a schematic illustration of the spectral reflectivity, in which spectral reflectivity is plotted as the ordinate and wavelength as the abscissa. The spectral reflectivity curves may be measured by means of a spectrophotometer, for example a spectrophotometer Perkin Elmer Lambda 850 fitted with URA (Universal Reflectance Accessory).

The average reflectance factor, abbreviated $R_m$, is such as defined in ISO 13666:1998 standard, and measured according to ISO 8980-4 standard (at an angle of incidence of less than 17°, typically of 15°), i.e. it represents the spectral reflectivity (unweighted) average within the whole light spectrum of from 400 nm to 700 nm.

In the same way, the luminous reflectance factor, abbreviated $R_v$, also called "average luminous reflectance factor" in the present application is such as defined in ISO 13666:1998 standard, and measured according to ISO 8980-4 standard (at an angle of incidence of less than 17°, typically of 15°), i.e. it represents the spectral reflectivity weighted average within the whole visible light spectrum ranging from 380 nm to 780 nm.

By analogy, an average blue reflectance factor is defined between 420 nm and 450 nm, abbreviated $R_{m,B}$, which corresponds to the spectral reflectivity (unweighted) average within the wavelength range of from 420 nm to 450 nm.

According to the invention, this average blue reflectance factor $R_{m,B}$ may be measured at an angle of incidence on the main face comprising the filter ranging from 0° (normal incidence) to 15°, preferably at 15°.

It should be further noted in the present application, that:
$R_\theta(435\ nm)$ is the reflectivity value of the ophthalmic lens main face provided with the filter according to the present invention, this value being determined (by measuring or calculating) at a wavelength of 435 nanometers and for an angle of incidence $\theta$ on the main face comprising the filter ranging from 0° to 15°, and $R_{\theta'}(435\ nm)$ is the reflectivity value of the ophthalmic lens main face provided with the filter according to the present invention, this value being determined (by measuring or calculating) at a wavelength of 435 nanometers and for an angle of incidence $\theta'$ on the main face comprising the filter ranging from 30° to 45°.

Thereafter a parameter $\Delta(\theta,\theta')$ will be defined using the following relation: $\Delta(\theta,\theta')=1-[R_{\theta'}(435\ nm)/R_\theta(435\ nm)]$. Hereafter it will be explained in the following specification how this parameter $\Delta(\theta,\theta')$ can be used to evaluate the capacity of the ophthalmic lens to limit the amount of phototoxic blue light striking the retina of a wearer, by respectively taking into account the respective contributions of blue light originating from the front face side or from the back face side of the lens.

According to the present invention, the filter provides the ophthalmic lens main face provided with the filter with the ability to present, for an angle of incidence on this main face ranging from 0° to 15°, an average blue reflectance factor $R_{m,B}$ which is higher than or equal to 5%.

The filter is thus especially designed to maximize the average blue reflectance factor $R_{m,B}$. This makes it possible to maximize the rejection of phototoxic blue light, within the wavelength range of from 420 nm to 450 nm, directly arriving on the front main face of the lens. It is considered herein that the major part of the direct light originating from the front of the ophthalmic lens wearer and reaching the retina of the same has a low incidence on the front main face, generally ranging from 0° to 15°.

In a preferred embodiment of the present invention, the average blue reflectance factor $R_{m,B}$, for an angle of incidence on the ophthalmic lens main face provided with the filter ranging from 0° to 15°, preferably of 15°, is higher than or equal to 10%, more preferably higher than or equal to 20%, and even more preferably higher than or equal to 30%, and most preferably higher than or equal to 50%.

According to the present invention, the filter further provides the main face comprising the filter with the ability to present a spectral reflectivity curve for an angle of incidence on this main face ranging from 0° to 15°, preferably of 15°, which presents:

a maximum reflectivity at a wavelength of less than 435 nanometers, and a full width at half maximum (FWHM) higher than or equal to 80 nanometers.

Figure 2:
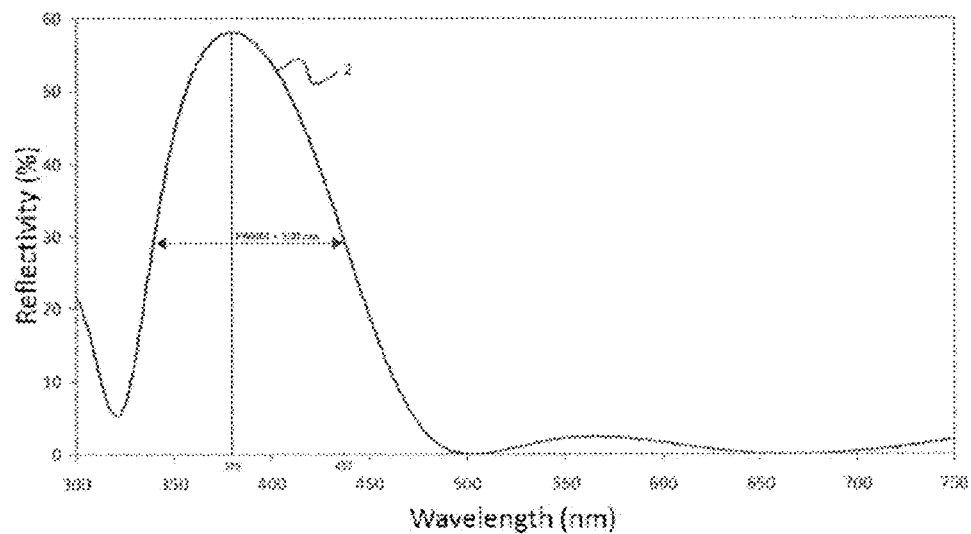
Figure 3:
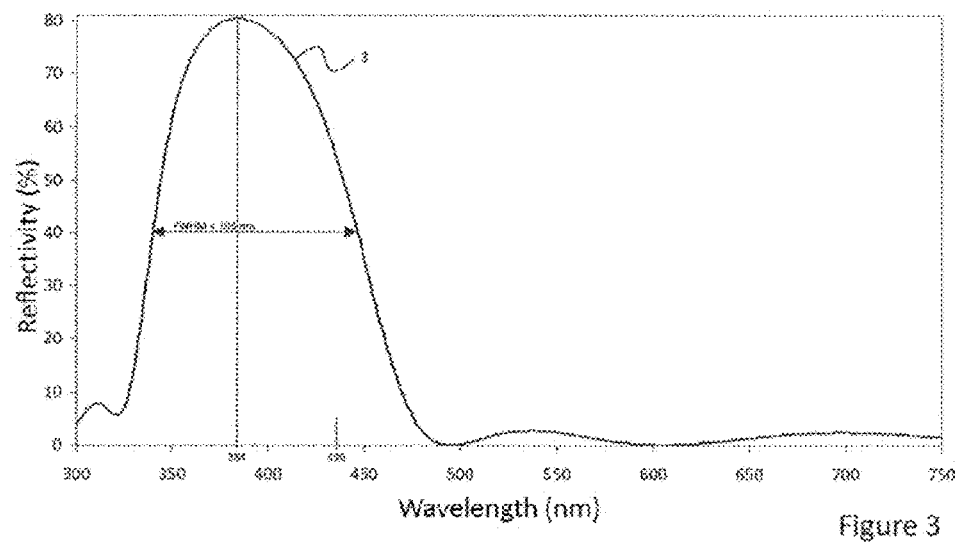

Indeed, as can be seen on FIGS. 1 to 3, the spectral reflectivity curves of the front main face of the ophthalmic lenses of the invention, generally have, within the wavelength range of from 380 nm to 500 nm, a "bell" shape which can be characterized through its height (maximum reflectivity) and its full width at half maximum (FWHM).

According to the present invention, the maximum reflectivity is obtained at a wavelength lower than 435 nm. It is thus shifted as compared to the central wavelength (435 nm) of the 420 nm-450 nm range phototoxic blue light wavelength band.

Preferably, the maximum reflectivity is observed at a wavelength lower than or equal to 410 nm, more preferably lower than or equal to 400 nm and even more preferably lower than or equal to 390 nm.

In a preferred embodiment, such shift is limited so that the maximum reflectivity is also at a wavelength higher than or equal to 350 nm. Preferably, the maximum reflectivity is observed at a wavelength higher than 360 nm, more preferably higher than or equal to 370 nm.

According to the present invention, the full width at half maximum of the relevant spectral reflectivity curve, for an angle of incidence on the main face comprising the filter ranging from 0° to 15°, is higher than or equal to 80 nm.

A filter sized up so that the spectral reflectivity curve for an angle of incidence on the main face comprising the filter ranging from 0° to 15°, has a full width at half maximum (FWHM) higher than or equal to 80 nanometers, will be thereafter referred to as a large filter.

In a preferred embodiment, the full width at half maximum is higher than or equal to 90 nanometers, preferably higher than or equal to 100 nanometers.

Also preferably, the full width at half maximum is lower than 150 nanometers, more preferably lower than 120 nanometers, even more preferably lower than 110 nm.

Still according to the present invention, the filter finally provides the ophthalmic lens main face provided with the filter with the ability to present a parameter $\Delta(\theta,\theta')$, such as previously defined, higher than or equal to 0.6.

Such as previously defined, the parameter $\Delta(\theta,\theta')$ depends both on the reflectivity at 435 nm for an angle of incidence $\theta$ on the main face ranging from 0° to 15°, abbreviated $R_\theta(435\ nm)$, and on the reflectivity at 435 nm for an angle of incidence $\theta'$ on the main face ranging from 30° to 45°, abbreviated $R_{\theta'}(435\ nm)$.

Should an ophthalmic lens of the invention be placed in front of the wearer's eye, as explained in the introducing part, it should be understood that the amount of phototoxic blue light within the wavelength range of from 420 nm to 450 nm directly arriving on the front main face of the ophthalmic lens and reaching the wearer's eye conversely varies as compared to the measurable value $R_\theta(435\ nm)$.

In the same manner, the amount of phototoxic blue light within the wavelength range of from 420 nm to 450 nm indirectly arriving from the wearer's background and being reflected by the ophthalmic lens varies in the same way as the measurable value $R_{\theta'}(435\ nm)$.

Thus, by choosing a parameter $\Delta(\theta,\theta')$ such as $\Delta(\theta,\theta')\geq 0.6$, an ophthalmic lens is obtained with an efficient filter, that is optimized against phototoxic blue light. Indeed, the parameter $\Delta(\theta,\theta')$ will increase especially as:

(i) the reflectivity value $R_{\theta'}(435\ nm)$ is low, i.e. the amount of phototoxic blue light coming from the wearer's background and reflected by the ophthalmic lens in the direction of the wearer's retina is low, and (ii) the reflectivity value $R_\theta(435\ nm)$ is high, i.e. the amount of phototoxic blue light directly arriving on the front main face of the ophthalmic lens and reflected by the same is high.

In a preferred embodiment, the parameter $\Delta(\theta,\theta')$ of the ophthalmic lens provided with a large filter according to the invention is higher than or equal to 0.7, more preferably higher than or equal to 0.75, and even more preferably higher than or equal to 0.8.

Preferably, the parameter $\Delta(\theta,\theta')$ is determined for an angle of incidence $\theta$ that is essentially equivalent to 15° and an angle of incidence $\theta'$ essentially equivalent to 45°.

Preferably, the average transmission factor in the blue region between 465 nm and 495 nm of the ophthalmic lens of the invention (for an angle of incidence on the front main face ranging from 0° to 15°), which corresponds to the spectral transmittance (unweighted) average within the wavelength range of from 465 nm to 495 nm, is higher than or equal to 80%, more preferably higher than or equal to 85%, and even more preferably higher than or equal to 90%.

This makes it especially possible to ensure that blue light with a wavelength ranging from 465 nm to 495 nm, which ensures the synchronization of the biological clock, would be for the major part thereof transmitted to the eye of a wearer using this ophthalmic lens.

Preferably, the ophthalmic lens transmission factor at 480 nm for an angle of incidence on the front main face ranging from 0° to 15° is higher than or equal to 70%, more preferably higher than or equal to 90%, and even more preferably higher than or equal to 95%.

In a preferred embodiment of the present invention, the filter deposited onto the lens is an interference filter. As used herein, such a filter is intended to mean a filter comprising at least one layer formed on one of the main faces of the ophthalmic lens provided with the interference filter, this layer having a refractive index which is different by at least 0.1 unit from the substrate refractive index. The optical properties of such a filter, such as for example reflectivity, result from interferences due to the multiple reflections at the air/layer and substrate/layer interfaces.

A layer in the filter is defined as having a deposited thickness higher than or equal to 1 nm. Thus, any layer having a thickness lower than 1 nm will not be taken into account in the number of layers present in the filter. An optional sublayer inserted between the filter and the substrate won't be taken into account either in the number of layers present in the interference filter.

Unless otherwise specified, all layer thicknesses disclosed in the present application are physical thicknesses, not optical thicknesses.

Should the interference filter of the invention comprise at least two layers, it would then comprise a stack of at least one layer with a high refractive index, or "high index-layer", referred to as HI layer, and of at least one layer with a low refractive index, or "low index-layer", referred to as LI layer.

In a preferred embodiment, the interference filter comprises less than 11 layers, preferably it has a number of layers ranging from 2 to 10 layers, more preferably from 4 to 9 layers, most preferably from 4 to 7 layers. HI and LI layers do not need to alternate within the interference filter stack, although one embodiment of the invention also envisages they could. Two HI layers (or more) may be deposited onto each other, as well as may two LI layers (or more).

In the present application, a layer of the interference filter is said to be a "layer with a high refractive index" when the refractive index thereof is higher than 1.60, preferably higher than or equal to 1.65, more preferably higher than or equal to 1.70, even more preferably higher than or equal to 1.80 and most preferably higher than or equal to 1.90. In the same way, a layer of the interference filter is said to be a layer with a low refractive index when the refractive index thereof is lower than 1.50, preferably lower than or equal to 1.48, more preferably lower than or equal to 1.47.

Unless otherwise stated, the refractive indexes disclosed in the present application are expressed at a temperature of 25° C. and for a reference wavelength of 550 nm.

The HI layer is a traditional layer with a high refractive index, well known from the person skilled in the art. It generally comprises one or more mineral-type oxides such as, but with no limitation: zirconia ($ZrO_2$), titanium oxide ($TiO_2$), alumina ($Al_2O_3$), tantalum pentoxide ($Ta_2O_5$), neodymium oxide ($Nd_2O_5$), praseodymium oxide ($Pr_2O_3$), praseodymium titanate ($PrTiO_3$), lanthanum oxide ($La_2O_3$), niobium pentoxide ($Nb_2O_5$), or yttrium oxide ($Y_2O_3$). Optionally, HI layers may also contain silica or other materials with a low refractive index, as long as their refractive index is higher than 1.60 as indicated hereabove. Preferred materials include $TiO_2$, $PrTiO_3$, $ZrO_2$, $Al_2O_3$, $Y_2O_3$ and combinations thereof.

The LI layer is also a traditional, well-known, layer with a low refractive index and may comprise, with no limitation: silica ($SiO_2$), or a mixture of silica and alumina, in particular of silica doped with alumina, the latter contributing to increase the thermal resistance of the interference filter. The LI layer is preferably a layer comprising at least 80% by weight of silica, more preferably at least 90% by weight of silica, as compared to the LI layer total weight, and even more preferably consists of a silica layer.

Optionally, low-index layers may further contain materials with a high refractive index, as long as the refractive index of the resulting layer is lower than 1.50.

Should a LI layer be used, comprising a mixture of $SiO_2$ and $Al_2O_3$, it preferably comprises 1 to 10%, more preferably 1 to 8% and even more preferably 1 to 5% by weight of $Al_2O_3$ as compared to the silica+alumina total weight in this layer.

For example, $SiO_2$ layers doped with 4% $Al_2O_3$ by weight, or less, or a $SiO_2$ layer doped with 8% $Al_2O_3$ may be used. Mixtures of $SiO_2/Al_2O_3$ available on the market may be used, such as LIMA® marketed by UMICORE MATERIALS AG (refractive index ranging from 1.48 to 1.50), or L5® marketed by MERCK KGaA (refractive index 1.48, wavelength 500 nm).

The outer layer of the interference filter is generally a low index-layer, typically based on silica, comprising preferably at least 80% by weight of silica, more preferably at least 90% by weight of silica (for example a layer of silica doped with alumina), as compared to the total weight of this outer layer, and even more preferably consists of an outer layer of silica.

In a preferred embodiment, the filter has a total thickness lower than or equal to 700 nanometers, more preferably lower than or equal to 600 nm. The filter total thickness is generally higher than 200 nm, preferably higher than 250 nm.

In particular embodiments of the invention, where the filter is an interference filter comprising 8 or 9 layers, the stack total thickness preferably ranges from 450 nm to 600 nm.

In particular embodiments of the invention, where the filter is an interference filter comprising 6 or 7 layers, the stack total thickness is preferably lower than 500 nm, more preferably it ranges from 300 nm to 500 nm.

In particular embodiments of the invention, where the filter is an interference filter comprising 4 or 5 layers, the stack total thickness is preferably lower than 300 nm, more preferably it ranges from 200 nm to 300 nm.

As a rule, HI layers have a physical thickness ranging from 10 nm to 100 nm, more preferably lower than or equal to 80 nm, and even more preferably lower than or equal to 70 nm, and LI layers have a physical thickness ranging from 10 nm to 150 nm, more preferably lower than or equal to 135 nm, and even more preferably lower than or equal to 120 nm.

The ophthalmic lens of the invention may also be rendered antistatic, that is to say may not retain and/or develop any substantial electrostatic charge, thanks to the incorporation of at least one electro-conductive layer in the filter.

Preferably, there is an additional layer of a conducting oxide such as indium oxide, tin oxide, ITO (Indium Tin Oxide). This layer has a thickness that is generally lower than 20 nm, preferably between 5 nm and 15 nm.

It is preferably adjacent to a layer with a high index such as a zirconium oxide layer.

Preferably, this conductive layer is located under the last low index-layer of the filter (that is to say the layer that is the closest to the air), generally based on silica.

In an embodiment of the invention, the filter is deposited onto a sublayer. It should be understood here that this filter sublayer does not belong to the filter.

As used herein, a filter sublayer, or an adhesion layer, is intended to mean a coating having a relatively high thickness, used in order to improve the mechanical properties such as the abrasion resistance and/or the scratch resistance of the filter and/or to promote its adhesion to the substrate or to the underlying coating.

Given its relatively high thickness, the sublayer does generally not take part in the filtering optical activity of the filter, in particular in such situations where it has a refractive index close to that of the underlying coating (which is generally the abrasion-resistant coating and/or the scratch-resistant coating) or to that of the ophthalmic lens substrate, when the sublayer is directly deposited onto the ophthalmic lens substrate.

The sublayer should be thick enough to promote the abrasion resistance of the filter, but preferably not to the point where a light absorption could occur, which, depending on the nature of the sublayer, could significantly reduce the visual transmission factor $T_v$ such as defined in ISO 13666:1998 standard, and measured according to ISO 8980-3 standard.

The thickness of this sublayer is generally lower than 300 nm, more preferably lower than 200 nm, and is generally higher than 90 nm, more preferably higher than 100 nm.

The sublayer preferably comprises a $SiO_2$-based layer comprising preferably at least 80% by weight of silica, more preferably at least 90% by weight of silica, as compared to the sublayer total weight, and even more preferably consists of a sublayer of silica. The thickness of this sublayer based on silica is generally lower than 300 nm, more preferably lower than 200 nm, and is generally higher than 90 nm, more preferably higher than 100 nm.

In another embodiment, this $SiO_2$-based sublayer is an alumina-doped silica sublayer according to the hereabove given proportions, and preferably consists of a layer of silica doped with alumina.

In a particular embodiment, the sublayer consists of a $SiO_2$ layer.

It is preferred to use a sublayer of the monolayer type. However, the sublayer may be laminated (multilayer), especially when the sublayer and the underlying coating (or the substrate, should the sublayer be directly deposited onto the substrate) have a substantial difference between their respective refractive indexes. This is especially true when the underlying coating, which is generally an abrasion-resistant coating and/or a scratch-resistant coating, or the substrate, have a high refractive index, in other words a refractive index higher than or equal to 1.55, preferably higher than or equal to 1.57.

In such an event, the sublayer may comprise, in addition to a layer having a thickness ranging from 90 nm to 300 nm, which is referred to as the main layer, preferably at most three other layers, more preferably at most two other layers, which are inserted between the optionally coated substrate and said 90-300 nm-thick layer, which is generally a layer based on silica. Such additional layers are preferably thin layers, the function of which is to limit the multiple reflections at the sublayer/underlying coating interface or at the sublayer/substrate interface, whichever applies.

A multilayered sublayer preferably comprises, in addition to the main layer, a layer with a high refractive index and with a thickness lower than or equal to 80 nm, more preferably lower than or equal to 50 nm and even more preferably lower than or equal to 30 nm. This layer with a high refractive index directly contacts the substrate with a high refractive index or the underlying coating with a high refractive index, whichever applies. Of course, this embodiment may be used even if the substrate (or the underlying coating) has a refractive index of less than 1.55.

As an alternative, the sublayer comprises, in addition to the main layer and previously mentioned high refractive index layer, a layer of material the refractive index of which is lower than or equal to 1.55, preferably lower than or equal to 1.52. more preferably lower than or equal to 1.50 based on $SiO_2$ (that is to say comprising preferably at least 80% by weight of silica) with a thickness lower than or equal to 80 nm, more preferably lower than or equal to 50 nm and even more preferably lower than or equal to 30 nm, onto which is deposited said high refractive index layer. In such a case, the sublayer typically comprises, deposited in this order onto the optionally coated substrate, a 25 nm-thick layer of $SiO_2$, a 10 nm-thick layer of $ZrO_2$ or $Ta_2O_5$ and the sublayer main layer.

The filter and the optional sublayer are preferably deposited by deposition under vacuum according to any of the following methods: i) by evaporation, optionally ion-assisted evaporation; ii) by ion beam sputter deposition; iii) by cathode sputtering; iv) by plasma-assisted vapor phase deposition. These various methods are described in "*Thin Film Processes*" and "*Thin Film Processes II*" (Vossen & Kern Edition, Academic Press, 1978 and 1991 respectively). A particularly recommended method is the vacuum evaporation process.

When the filter is an interference filter, the deposition of each of the layers of the filter stack and of the optional sublayer is preferably effected through evaporation under vacuum.

In a particular embodiment of the present invention, the ophthalmic lens has an average luminous reflectance factor $R_v$ on the ophthalmic lens main face provided with the filter which is lower than or equal to 2.5%. Preferably, the average luminous reflectance factor $R_v$ is lower than or equal to 2%, even more preferably lower than or equal to 1.5%. In a particularly preferred embodiment, the average luminous reflectance factor $R_v$ is lower than or equal to 0.7%, more preferably lower than or equal to 0.6%.

In a preferred embodiment, the ophthalmic lens has an average luminous reflectance factor $R_v$ on each of the main faces of the ophthalmic lens which is lower than or equal to 2.5%. More preferably, this average luminous reflectance factor $R_v$ is lower than or equal to 0.7%.

In a preferred embodiment of the invention, the main face coated with the filter according to the invention is the front main face of the ophthalmic lens of the invention and the back main face is coated with a traditional antireflection coating or preferably an antireflection coating efficient within the UV region, that is to say reflecting little UV radiation, such as those described for example in PCT/EP2011/072386.

The average reflectance factor within the UV region $R_{UV}$ on the ophthalmic lens back main face, for wavelengths ranging from 280 nm to 380 nm, weighted by the function $W(\lambda)$ defined in ISO 13666:1998 standard, is lower than or equal to 7%, more preferably lower than or equal to 6%, and even more preferably lower than or equal to 5%, for an angle of incidence of 30° and for an angle of incidence of 45°. The average reflectance factor within the UV region $R_{UV}$ is defined by the relation:

$$R_{UV} = \frac{\int_{280}^{380} W(\lambda) \cdot R(\lambda) \cdot d\lambda}{\int_{280}^{380} W(\lambda) \cdot d\lambda}$$

wherein $R(\lambda)$ is the spectral reflectivity on the ophthalmic lens back main face at the relevant wavelength, and $W(\lambda)$ is a weighting function that is equal to the product of solar spectral irradiance $Es(\lambda)$ and relative spectral efficiency function $S(\lambda)$.

The spectral function $W(\lambda)$, which enables to calculate the UV radiation transmission factors is defined in ISO 13666:1998 standard.

The antireflection coating efficient within the UV region preferably comprises a stack of at least one high refractive index layer and at least one low refractive index layer.

In another embodiment of the present invention, both front and back main faces are provided with a filter against phototoxic blue light. The two filters thus formed, for the one on the front main face and for the other one on the back main face, may then be the same or different.

The filter according to the invention may be directly deposited onto a bare substrate. In some applications, it is preferred that the ophthalmic lens main face provided with the filter be coated with one or more functional coatings prior to forming the filter on such main face. These functional coatings, which are classically used in optics, may be, with no limitation: an impact-resistant primer, an abrasion-resistant and/or scratch-resistant coating, a polarized coating, a tinted coating.

As a rule, the front and/or back main face of the substrate onto which a filter will be formed is coated with an impact-resistant primer and an abrasion-resistant and/or scratch-resistant coating.

The filter is preferably deposited onto an abrasion-resistant and/or scratch-resistant coating. The abrasion-resistant and/or scratch-resistant coating may be any layer classically used as an abrasion-resistant and/or scratch-resistant coating in the ophthalmic lens field. Such coatings are described, amongst others, in EP 0614957.

The ophthalmic lens of the invention may also comprise coatings formed on the filter which are able to modify the surface properties thereof, such as hydrophobic and/or oleophobic coatings (anti-fouling "top coat") and/or anti-fogging coatings. Such coatings are described, amongst others, in U.S. Pat. No. 7,678,464. These coatings are preferably deposited onto the outer layer of the filter. Their thickness is generally lower than or equal to 10 nm, preferably ranging from 1 nm to 10 nm, more preferably ranging from 1 nm to 5 nm.

Typically, an ophthalmic lens of the invention comprises a substrate, which has been successively coated on the front main face thereof with an impact-resistant primer layer, an abrasion-resistant and/or scratch-resistant layer, a filter according to the present invention, and a hydrophobic and/or oleophobic coating.

The ophthalmic lens of the invention is preferably an ophthalmic lens for spectacles, or an ophthalmic lens blank. The invention thus further relates to spectacles comprising at least one such ophthalmic lens.

Said ophthalmic lens may be a polarized lens, or a solar, tinted lens, with a corrective action or not.

The back main face of the optical article substrate may be successively coated with an impact-resistant primer layer, an abrasion-resistant and/or scratch-resistant coating, an anti-reflection coating which may be, or not, a UV-antireflection coating, and with a hydrophobic and/or oleophobic coating.

Such a lens is particularly advantageous for protecting against blue light-induced phototoxicity a wearer's eye suffering from a deterioration process, in particular from a degenerative process such as from age-related macular degeneration.

An ophthalmic lens such as described hereabove also advantageously provides the wearer with an improved visual contrast.

The following examples illustrate the invention in a more detailed, although non-limiting manner.

EXAMPLES

1. General Processes and Procedures

The filters according to the invention are deposited onto ORMA® lenses coated with an abrasion-resistant coating such as described in the Example 3 of the European patent EP/614957.

The evaporating device and the conditions for depositing the $SiO_2$ and $ZrO_2$ layers (evaporation rate, pressure) are such as described in the patent application WO 2008/107325.

2. Calculation of the Curves

The spectral reflectivity curves of the filters according to the invention have been modelized from the software *Essential Mac Leod* (version 9.4) of Thin Film Center.

The characteristics of the filters and their properties are given at point 3 hereunder.

The ophthalmic lenses provided with the filters of examples 1 and 2 have been effectively prepared and the spectral reflectivity curves have been measured.

It has been controlled that the obtained curves did correspond to the modelized curves.

3. Filter Stacks and Properties Spectral Reflectivity Curves. Results

The structural characteristics and the optical performances of the ophthalmic lenses obtained in Examples 1 to 3 are detailed hereunder (see the following page).

The spectral reflectivity curves at an angle of incidence on the front main face of 15° and for wavelengths ranging from 280 nm to 780 nm of Examples 1 to 3 below are illustrated on FIGS. 1 to 3.

The average reflectance factor values are those of the front main face. The factors $R_{m,B}$ and $R_v$ are indicated for an angle of incidence of 15°.

In the table below, the parameter $\Delta$ spectral @ 15° is defined by the relation: $\Delta$ spectral @ $15°=[R_{15°}(435\ nm)-R_{15°}(480\ nm)]/R_{15°}(435\ nm)$, wherein $R_{15°}(435\ nm)$ and $R_{15°}(480\ nm)$ respectively represent the reflectivity of the front main face at 435 nm and at 480 nm, for an angle of incidence of 15° on the front main face.

It can be observed that the ophthalmic lenses of the invention have very good phototoxic blue light reflecting properties ($R_{m,B}>10\%$), without being detrimental to the anti-reflection performances in the visible region ($R_v<2.5\%$ for an angle of incidence of 15°).

Moreover, the ophthalmic lenses obtained in Examples 1 to 3 show outstanding transparency properties and a good colorimetric neutrality, a good resistance to abrasion and scratches and a good resistance to a hot water dip treatment followed with a mechanical stress on the surface. The coating adhesion to the substrate is also very satisfying.

| Ex. 1: 4-layer large filter on the front main face | |
|---|---|
| Substrate + hard coat | |
| ZrO2 | 34 nm |
| SiO2 | 35 nm |
| ZrO2 | 73 nm |
| SiO2 | 110 nm |
| Air | |
| Total thickness | 252 nm |
| Rm, B @ 15° (420-450 nm) | 11.8% |
| Max. Reflectivity | 359 nm |
| Full width at half maximum | 98 nm |
| $\Delta(\theta = 15°, \theta' = 45°)$ @ 435 nm | 0.72 |
| Rm @ 15° (465-495 nm) | 2.3% |
| $\Delta$ spectral @ 15° 435 nm/480 nm | 0.85 |
| Rv @ 15° (380-780 nm) | 0.5% |

-continued

Ex. 2: 6-layer large filter on the front main face

| Substrate + hard coat | |
|---|---|
| ZrO2 | 44 nm |
| SiO2 | 45 nm |
| ZrO2 | 68 nm |
| SiO2 | 32 nm |
| ZrO2 | 66 nm |
| SiO2 | 124 nm |
| Air | |
| Total thickness | 379 nm |
| Rm, B @ 15° (420-450 nm) | 30.6% |
| Max. Reflectivity | 379 nm |
| Full width at half maximum | 100 nm |
| Δ(θ = 15°, θ' = 45°) @ 435 nm | 0.75 |
| Rm @ 15° (465-495 nm) | 4.5% |
| Δ spectral @ 15° 435 nm/480 nm | 0.92 |
| Rv @ 15° (380-780 nm) | 1.9% |

Ex. 3: 8-layer large filter on the front main face

| Substrate + hard coat | |
|---|---|
| ZrO2 | 47 nm |
| SiO2 | 50 nm |
| ZrO2 | 54 nm |
| SiO2 | 70 nm |
| ZrO2 | 45 nm |
| SiO2 | 62 nm |
| ZrO2 | 53 nm |
| SiO2 | 134 nm |
| Air | |
| Total thickness | 515 nm |
| Rm, B @ 15° (420-450 nm) | 51.5% |
| Max. Reflectivity | 384 nm |
| Full width at half maximum | 105 nm |
| Δ(θ = 15°, θ' = 45°) @ 435 nm | 0.80 |
| Rm @ 15° (465-495 nm) | 7.3% |
| Δ spectral @ 15° 435 nm/480 nm | 0.95 |
| Rv @ 15° (380-780 nm) | 2.0% |

Figure 4:
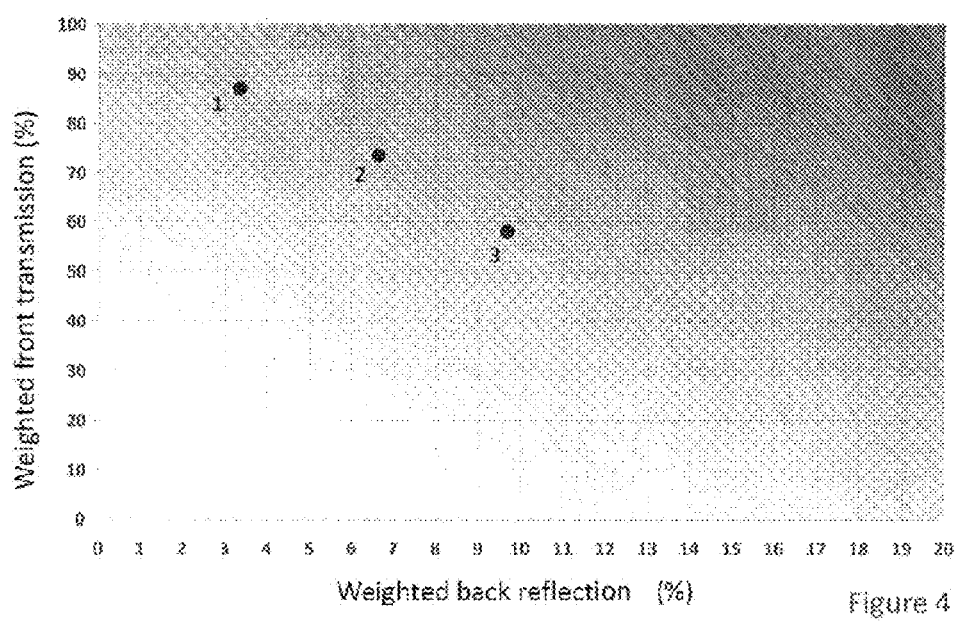
FIG. 4 shows for each of the preceding examples the weighted transmission factor (%) and the weighted back reflectivity (%), the weighting being made based on the blue light hazard function.

Moreover, the efficiency of the ophthalmic lenses of the invention of Examples 1 to 3 can be considered based on FIG. 4.

The back reflectance BR(λ) and the transmission T(λ) of the optical system as a whole (with the blue filter corresponding to Examples 1, 2 and 3, on the front face of an ORMA® glass lens of the biplane type with an antireflection Crizal Forte® UV on the back face ($R_v$=0.59%, $R_{UV}$=3.1% for an incidence of 45°), have been determined by means of the software Essential Mac Leod for each of the test filters.

The calculation takes all the multiple reflections into account, which occur within the ophthalmic lens.

To evaluate the blue light-induced hazard, these transmission and reflection curves are weighted using the spectral function $W_B(\lambda)$ of ISO 8980-3 international standard. This function results from the product of blue light hazard function B(λ) and spectral distribution of solar radiation function $E_S(\lambda)$ integrated within the 380 nm to 500 nm range of wavelengths.

Spectral functions for the calculation of the light transmission or reflection values within the 380-500 nm range:

TABLE 1 numeric data for use to calculate the weighting function $W_B(\lambda)$.

| Wavelength λ (nm) | Spectral solar radiation Es(λ) (mW/m² · nm) | Blue light hazard function B(λ) | Weighting function $W_B(\lambda)$ = Es(λ) · B(λ) |
|---|---|---|---|
| 380 | 336 | 0.006 | 2 |
| 385 | 365 | 0.012 | 4 |
| 390 | 397 | 0.025 | 10 |
| 395 | 432 | 0.05 | 22 |
| 400 | 470 | 0.10 | 47 |
| 405 | 562 | 0.20 | 112 |
| 410 | 672 | 0.40 | 269 |
| 415 | 705 | 0.80 | 564 |
| 420 | 733 | 0.90 | 660 |
| 425 | 760 | 0.95 | 722 |
| 430 | 787 | 0.98 | 771 |
| 435 | 849 | 1.00 | 849 |
| 440 | 911 | 1.00 | 911 |
| 445 | 959 | 0.97 | 930 |
| 450 | 1006 | 0.94 | 946 |
| 455 | 1037 | 0.90 | 933 |
| 460 | 1080 | 0.80 | 864 |
| 465 | 1109 | 0.70 | 776 |
| 470 | 1138 | 0.62 | 706 |
| 475 | 1161 | 0.55 | 639 |
| 480 | 1183 | 0.45 | 532 |
| 485 | 1197 | 0.40 | 479 |
| 490 | 1210 | 0.22 | 266 |
| 495 | 1213 | 0.16 | 194 |
| 500 | 1215 | 0.10 | 122 |

On FIG. 4 are represented:

as the abscissa: the back reflectance value weighted by the blue light hazard weighting function, for an angle of incidence on the back main face of 45°.

$$BR_B = \frac{\int_{380}^{500} W_B(\lambda) \cdot BR(\lambda) \cdot d\lambda}{\int_{380}^{500} W_B(\lambda) \cdot d\lambda}$$

wherein BR(λ) is the glass back reflectance spectral factor, and as the ordinate: the transmission value weighted by the blue light hazard weighting function. This transmission value represents the part (%) of direct light that is transmitted within the blue-purple range (from 380 nm to 500 nm) through this ophthalmic lens for an angle of incidence on the front main face of 0°.

$$T_B = \frac{\int_{380}^{500} W_B(\lambda) \cdot T(\lambda) \cdot d\lambda}{\int_{380}^{500} W_B(\lambda) \cdot d\lambda}$$

wherein T(λ) is the glass spectral factor of transmission.

The measurable value $W_B(\lambda)$ is the weighting function which is the product of spectral solar radiation Es(λ) and blue light hazard function B(λ) (see table 1).

It can be observed on FIG. 4 that Examples 1 to 3 of ophthalmic lenses according to the invention not only exhibit a low transmission, but also a low back reflectance.

Thus, the ophthalmic lenses of the examples of the invention enable to prevent a degenerative process of a wearer's eye as a consequence of blue light-induced phototoxicity, such as age-related macular degeneration.

Figure 5:
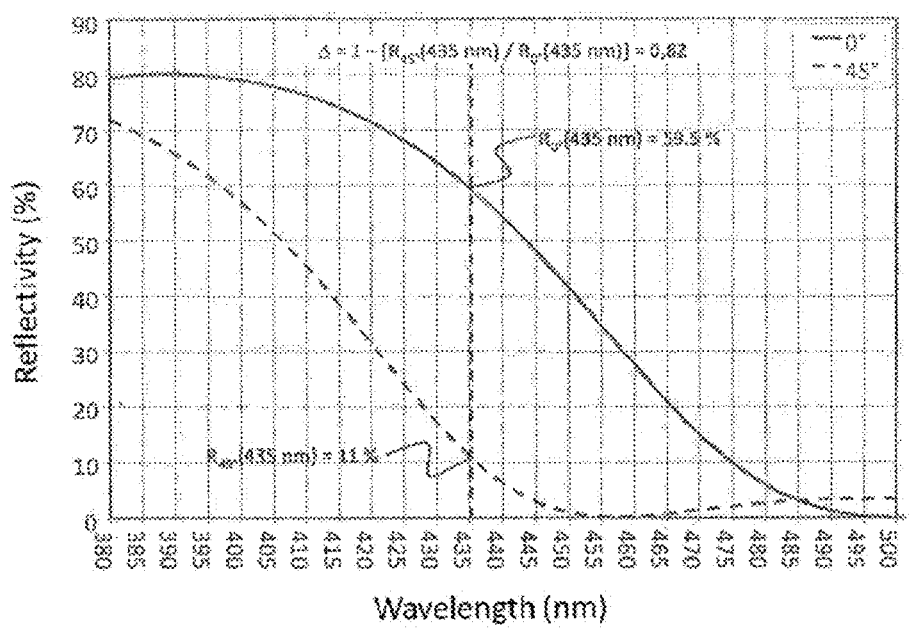
FIG. 5 represents the spectral reflectivity curves between 380 nm and 500 nm of the ophthalmic lens of Example 3 of the present application for angles of incidence on the front main face of 0° and 45°.

FIG. 5 represents the 380 nm to 500 nm spectral reflectivity curves of the ophthalmic lens of Example 3 for angles of incidence on the front main face of 0° and 45°.

It should be noted when considering the figure that the spectral reflectivity curve at 45° is shifted toward shorter wavelengths (i.e. to the deep blue and UV regions) as compared to the spectral reflectivity curve at 0°. This is an illustration of the high angular selectivity of the large filter of Example 3.

This shift then results in a low spectral reflectivity value at 435 nm for an angle of incidence of 45°, abbreviated $R_{45°}(435\ nm)$, that is equal to 11%, i.e. is much lower than the spectral reflectivity value at 435 nm for an angle of incidence of 0°, abbreviated $R_{0°}(435\ nm)$, that is equal to 59.5%.

It is thus understood that here the value of the parameter $\Delta(\theta,\theta')$ is high and equal to 0.82. This applies for all the ophthalmic lenses provided with at least one large filter according to the present invention.

The invention claimed is:

1. An ophthalmic lens with a front main face and a back main face, the ophthalmic lens comprising:
    a means for cutting off ultraviolet (UV) light arriving on the front main face of the ophthalmic lens;
    an antireflection coating, on the back main face of the ophthalmic lens, having a weighted average reflection factor in the UV lower than or equal to 7% for an angle of incidence of 30° and for an angle of incidence of 45°; and
    at least one means blocking at least partially the blue light in the wavelength range extending from 400 to 460 nanometers, said blue-light blocking means being a blue-light blocking filter formed on at least one main face of the lens,
    wherein
    said blue-light blocking filter is an interference filter and has the following properties:
    a spectral reflectivity curve for an angle of incidence ranging from 0° to 15° having:
        i) a reflectivity maximum at a wavelength lower than 410 nanometers, and
        ii) a full width at half maximum (FWHM) higher than or equal to 70 nm; and
    the main face provided with the blue-light blocking filter has the ability to present, for an angle of incidence on said main face ranging from 0° to 15°, an average blue reflectance factor Rm,B within a wavelength range of from 420 nanometers to 450 nanometers which is higher than or equal to 5%, and
    wherein the average luminous factor Rv on the main face of the ophthalmic lens comprising the filter is lower than or equal to 2.5%.

2. The ophthalmic lens of claim 1, wherein the means for cutting off UV light arriving on the front main face cuts off 90% or more of the UV light.

3. The ophthalmic lens of claim 1, wherein the means for cutting off UV light arriving on the front main face consists of a lens substrate, a lens substrate in which one or more UV absorbers are dispersed, a UV-absorbing coating placed on the front main face, a UV-reflecting coating placed on the front face or a combination of these means.

4. The ophthalmic lens of claim 1, wherein the blue-light blocking means blocks from 5 to 50% of the blue light in the wavelength range from 400 to 460 nanometers.

5. The ophthalmic lens of claim 1, wherein at the blue-light blocking means blocks from 5 to 50% of the blue light in the wavelength range from 420 to 450 nanometers.

6. The ophthalmic lens of claim 1, wherein said blue-light blocking filter provides the main face comprising said filter with the following property:
    for an angle of incidence $\theta'$ ranging from 0° to 15° and for an angle of incidence $\theta'$ ranging from 30° to 45°, a parameter $\Delta(\theta,\theta')$ defined by the relation $\Delta(\theta,\theta')=1-[R_{\theta'}(435\ nm)\ /\ R_{\theta}(435\ nm)]$, so that this parameter $\Delta(\theta,\theta')$ is higher than or equal to 0.5, where
        $R_{\theta}(435\ nm)$ represents the reflectivity value of the main face comprising said filter at a 435 nanometer-wavelength for the angle of incidence $\theta$, and
        $R_{\theta'}(435\ nm)$ represents the reflectivity value of the main face comprising said filter at a 435 nanometer-wavelength for the angle of incidence $\theta'$.

7. The ophthalmic lens of claim 6, wherein the angle of incidence $\theta=15°$ and the angle of incidence $\theta'=45°$.

8. The ophthalmic lens of claim 1, wherein the average light reflection factor ($R_v$) on each of the main faces of the ophthalmic lens is lower than or equal to 2.5%.

9. The ophthalmic lens of claim 8, wherein the average light reflection factor (Rv) on each of the main faces of the ophthalmic lens is lower than or equal to 1.5%.

10. The ophthalmic lens of claim 1, wherein the weighted average reflection factor in the UV of the antireflection coating on the back main face is lower than or equal to 6% for the angle of incidence of 30° and for the angle of incidence of 45°.

11. The ophthalmic lens of claim 10, wherein the weighted average reflection factor in the UV of the antireflection coating on the back main face is lower than or equal to 5%.

12. The ophthalmic lens of claim 1, wherein said blue-light blocking filter provides the main face comprising said filter with the following property:
    for an angle of incidence ranging from 0° to 15°, a parameter $\Delta_{spectral}$ defined by the relation $$\Delta_{spectral}=1-[R_{0°-15°}(480\ nm)/R_{0°-15°}(435\ nm)],$$

so that this parameter $\Delta_{spectral}$ is higher than or equal to 0.8, where
        $R_{0°-15°}(480\ nm)$ is the reflectivity value of the front main face at a 480 nanometer-wavelength for the relevant incidence, and
        $R_{0°-15°}(435\ nm)$ is the reflectivity value of the front main face at a 435 nanometer-wavelength for the relevant incidence.

13. The ophthalmic lens of claim 1, wherein said full width at half maximum (FWHM) is higher than or equal to 80 nm.

14. The ophthalmic lens of claim 1, wherein said full width at half maximum (FWHM) is lower than or equal to 150 nm.

15. The ophthalmic lens of claim 1, wherein said reflectivity maximum is at a wavelength lower than or equal to 400 nanometers.

16. The ophthalmic lens of claim 1, wherein said reflectivity maximum is at a wavelength lower than or equal to 390 nanometers.

17. The ophthalmic lens of claim 1, wherein the parameter $\Delta(\theta,\theta')$ is higher than or equal to 0.6.

18. The ophthalmic lens as claimed in claim 1, wherein the reflectivity maximum of said blue-light blocking means is at a wavelength in the range of 350 nm to 400 nm.

19. The ophthalmic lens as claimed in claim 1, wherein the average blue reflectance factor $R_{m,B}$ is higher than or equal to 10%.

20. The ophthalmic lens as claimed in claim 1, wherein the blue light blocking filter is formed on the front main face of the ophthalmic lens.

21. An ophthalmic lens with a front main face and a back main face, said ophthalmic lens comprising:
- a means for cutting off ultraviolet (UV) light arriving on the front main face of the ophthalmic lens;
- an antireflection coating, on the back main face of the ophthalmic lens, having a weighted average reflection factor in the UV lower than or equal to 7% for an angle of incidence of 30° and for an angle of incidence of 45°; and
- at least one means blocking at least partially the blue light in the wavelength range extending from 400 to 460 nanometers, said blue-light blocking means being a blue-light blocking filter formed on at least one main face of the lens, wherein
said blue-light blocking filter has the following properties:
- a spectral reflectivity curve for an angle of incidence ranging from 0° to 15° having:
  - i) a reflectivity maximum at a wavelength in the range of 360 nm to 400 nm, and
  - ii) a full width at half maximum (FWHM) higher than or equal to 70 nm; and
- the main face provided with the blue-light blocking filter has the ability to present, for an angle of incidence on said main face ranging from 0° to 15°, an average blue reflectance factor Rm,B within a wavelength range of from 420 nanometers to 450 nanometers which is higher than or equal to 5%.

22. An ophthalmic lens with a front main face and a back main face, said ophthalmic lens comprising:
- a means for cutting off ultraviolet (UV) light arriving on the front main face of the ophthalmic lens;
- an antireflection coating, on the back main face of the ophthalmic lens, having a weighted average reflection factor in the UV lower than or equal to 7% for an angle of incidence of 30° and for an angle of incidence of 45°; and
- at least one means blocking at least partially the blue light in the wavelength range extending from 400 to 460nanometers, said blue-light blocking means being a blue-light blocking filter formed on at least one main face of the lens, wherein
said blue-light blocking filter has the following properties:
- a spectral reflectivity curve for an angle of incidence ranging from 0° to 15° having:
  - i) a reflectivity maximum at a wavelength lower than 410 nm, and
  - ii) a full width at half maximum (FWHM) higher than or equal to 80 nm and lower than 150nm; and
- the main face provided with the blue-light blocking filter has the ability to present, for an angle of incidence on said main face ranging from 0° to 15°, an average blue reflectance factor $R_{m,B}$ within a wavelength range of from 420 nanometers to 450 nanometers which is higher than or equal to 5%.

* * * * *